US005582010A

United States Patent [19]

Lell

[11] Patent Number: 5,582,010

[45] Date of Patent: Dec. 10, 1996

[54] PYROTECHNIC DEVICE FOR THE PRESSURIZATION OF A HYDRAULIC CIRCUIT

[75] Inventor: Peter Lell, Moosburg, Germany

[73] Assignee: Daimler-Benz Aerospace AG, Ottobrunn, Germany

[21] Appl. No.: 529,110

[22] Filed: Sep. 15, 1995

[30] Foreign Application Priority Data

Sep. 17, 1994 [DE] Germany .......................... 44 33 212.2

[51] Int. Cl.[6] .......................... B60R 21/26; B60R 22/46; B60R 16/08; F15B 15/19

[52] U.S. Cl. .......................... 60/635; 60/638

[58] Field of Search .......................... 60/632, 635, 636, 60/638

[56] References Cited

U.S. PATENT DOCUMENTS

| | | | |
|---|---|---|---|
| 2,509,942 | 5/1950 | Sanford | 60/638 |
| 2,674,852 | 4/1954 | Olman | 60/636 |
| 2,912,902 | 11/1959 | Nessler | 60/632 |
| 3,031,845 | 5/1962 | Ludwig | 60/632 |
| 3,199,288 | 8/1965 | Nahas | 60/636 |
| 4,091,621 | 5/1978 | Patrichi | 60/635 |
| 5,303,631 | 4/1994 | Frehaut et al. | 60/638 |

FOREIGN PATENT DOCUMENTS

3937032A1 5/1991 Germany .

*Primary Examiner*—Timothy S. Thorpe
*Assistant Examiner*—William Wicker
*Attorney, Agent, or Firm*—McGlew & Tuttle

[57] ABSTRACT

A device with a pyrotechnic gas generator wherein gas pressurizes a hydraulic circuit via a cartridge-case base, a spring and a pressure piston. The pyrotechnic gas generator comprises a propellant charge, which is located in a combustion chamber and is ignited by an electronic igniting unit. The parts of the device are contained in a housing, which is exchangeably inserted into a wall surrounding the hydraulic circuit.

5 Claims, 1 Drawing Sheet

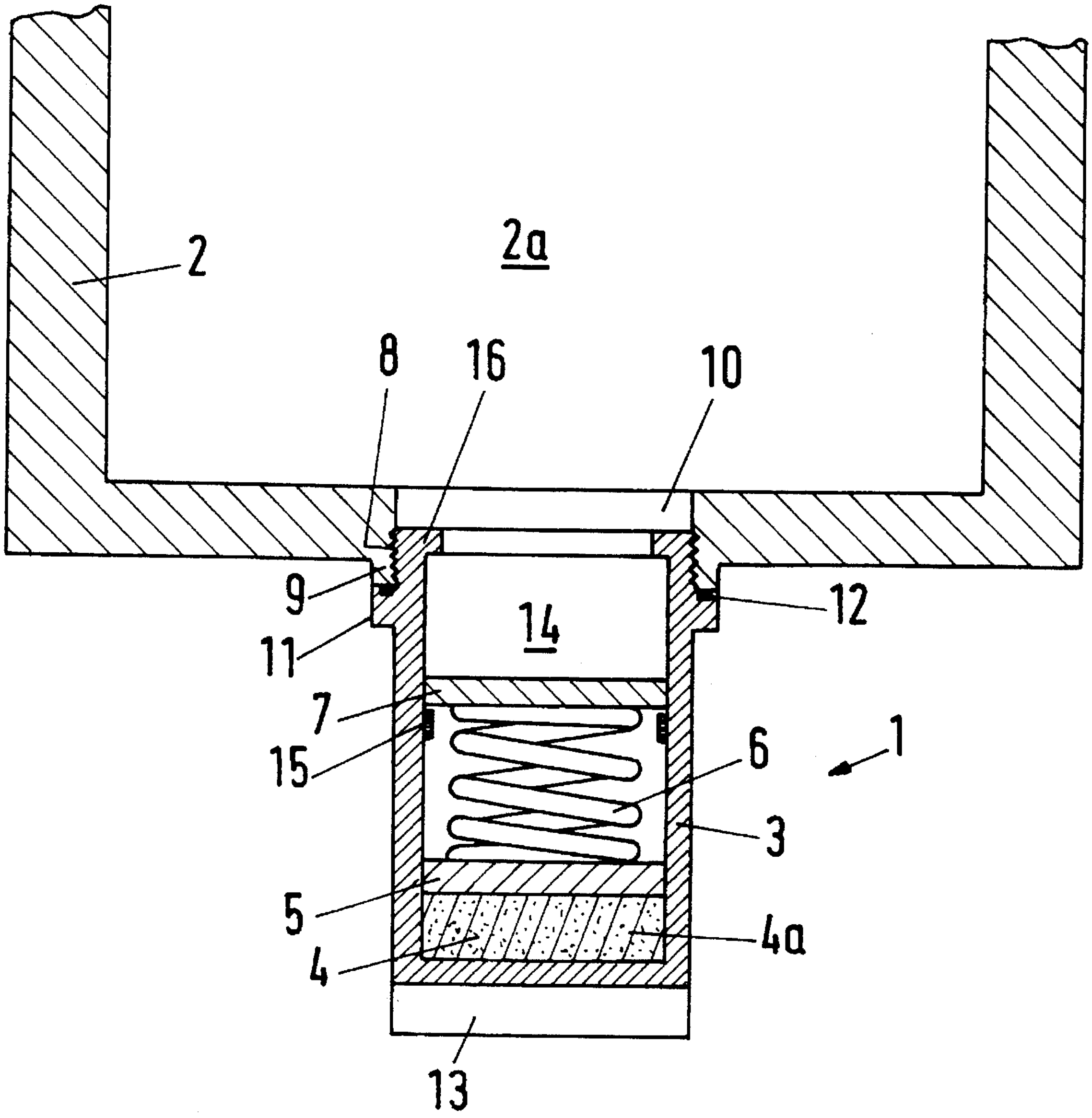
2
2a
8
16
10
9
12
14
11
7
1
15
6
3
5
4a
4
13

PYROTECHNIC DEVICE FOR THE PRESSURIZATION OF A HYDRAULIC CIRCUIT

FIELD OF THE INVENTION

The present invention pertains to a device which pressurizes a hydraulic circuit.

BACKGROUND OF THE INVENTION

Many units in recovery and rescue operations, switch-off systems with high-voltage circuits. Opening units for emergency doors, etc., are operated hydraulically. It is important here to rapidly pressurize the hydraulic circuits used for this purpose in order to make it possible to carry out the actuation reliably. The pressure necessary for the hydraulic circuits is supplied by units which do not start rapidly or often do not start at all, especially if they have been out of operation for a long time. Therefore, the unit in question cannot be used, or often it cannot be used rapidly enough.

DE 39 37 032 A1 discloses a pyrotechnic gas generator in which a high-pressure housing accommodating a pressurized gas-generating capsule is surrounded by a medium-pressure housing. The area of the discharge openings from the medium-pressure housing is considerably larger than the area of the discharge opening from the high-pressure housing into the medium-pressure housing. This gas generator is suitable, e.g., for a pyrotechnic force-generating element, in which the gas discharged from the openings of the medium-pressure housing impacts a piston which generates a pushing action.

SUMMARY AND OBJECTS OF THE INVENTION

The primary object of the present invention is to design a device of the type described in the introduction such that the hydraulic circuit is pressurized rapidly and reliably when needed.

According to the invention, a device is provided which pressurizes a hydraulic circuit. The device includes a pyrotechnic gas generator for generating gas for pressurizing the hydraulic circuit. The pressure is related to the hydraulic circuit by use of a cartridge-case base, spring and a pressure piston.

The pyrotechnic gas generator preferably comprises a propellant charge which is located within a combustion chamber and which is ignited by an electronic igniting unit.

The spring is preferably one of a coil spring, a disk spring or a pneumatic spring. The device for pressurizing is preferably provided as a unit contained in a housing which is exchangeably inserted into a wall surrounding a hydraulic tank connected to the hydraulic circuit. Oil is disposed within the tank and the pressure piston acts directly on the oil in the hydraulic tank. The movement of the piston is limited by a shoulder located at an end of the unit housing. The movement of the cartridge-case base is limited by a limit stop means, preferably a lock present in the housing.

The combustion chamber is preferably surrounded by a metallic bellows. This hermetically seals the propellant gases which are generated in the combustion chamber. The electronic igniting unit, which is normally provided with a pyrotechnic igniter piece, acts only on a heating wire, which wire then will ignite the propellant charge.

The essential advantage of the present invention is that the gas of the gas generator can be reliably generated by the pyrotechnic device even after storage for several years without any maintenance of the assembly unit. It is generated in a fraction of one second, and it can thus pressurize the hydraulic circuit via the cartridge-case base, the spring and the pressure piston. The spring guarantees that the pressure acting on the pressure piston can be maintained for a short time. In many units, e.g., emergency doors, a single-time pressure, which is exerted by the device according to the present invention, is sufficient. In other units, in which the hydraulic circuit must be under pressure for a long time, the device bridges over the time elapsing until, an emergency unit starts up and is fully able to be used.

The pyrotechnic gas generator of the device comprises a propellant charge (known in itself), which is located in a combustion chamber and is ignited by an electronic igniting unit with or without an igniter piece. Depending on the existing possibility, the electronic igniting unit is supplied with power current or from a battery. The spring, which maintains the gas pressure for a longer time, may be a coil spring, a disk spring or a pneumatic spring. All parts of the device are accommodated in a housing, which is exchangeably inserted into a wall of the hydraulic circuit. Depending on the task, a screw plug, a bayonet catch or a sliding closure may be used. The exchangeability guarantees rapid restoration of the ability to function after the use of the device. Experience has shown that gas generators function reliably for many years and require no maintenance.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a sectional view of the device for hydraulic circuit according to the invention.

DETAILED DESCRIPTION OF THE PREFERRED EMBODIMENT

The only figure schematically shows a device 1, which can be inserted into a wall 2 of a hydraulic tank. A combustion chamber 4 with a propellant charge **4*a*, a cartridge-case base 5, a coil spring 6, and a pressure piston 7 are accommodated in a housing 3. The housing 3 is screwed with a threaded part 8 into a mounting hole 10 of the wall 2. The hole 10 is provided with a thickening 9, and it is sealed via a shoulder 11, into which an 0-ring 12 is inserted. An electronic igniting unit 13 is attached to the housing 3**.

The device functions as follows. After the electronic igniting unit 13 has been switched on by means of power current or a battery available in the electronic igniting unit 13, the propellant charge **4*a* is ignited. The gas generated presses the cartridge-case base 5. The pressure is transmitted to the coil spring 6 and to the pressure piston 7. The pressure piston 7 exerts the desired pressure on the hydraulic oil 2*a* present in a space 14 above the pressure piston 7 and in the hydraulic tank 2. The maximum stroke of the cartridge-case base 5 is limited by a limit stop (a stop which prevents excessive axial movement of cartridge-case base 5) 15, and that of the pressure piston 7 is limited by a shoulder 16. The spring 6 maintains the pressure acting on the hydraulic oil. When the combustion chamber 4 with the propellant charge 4***a* is surrounded by a metallic bellows in a manner not shown, the propellant gases generated are hermetically sealed, so that no propellant gas molecules can escape to the outside.

While a specific embodiment of the invention has been shown and described in detail to illustrate the application of the principles of the invention, it will be understood that the invention may be embodied otherwise without departing from such principles.

What is claimed is:

1. A device for pressurizing a hydraulic circuit, comprising:

a pyrotechnic gas generator;

a cartridge-case base disposed in communication with said gas generator;

a spring in contact with said case base and a pressure piston for transmitting pressure to said hydraulic circuit.

2. A device according to claim 1, wherein said pyrotechnic gas generator comprises a combustion chamber, a propellant charge disposed in said combustion chamber and an electronic igniting unit, for igniting said propellant charge.

3. A device according to claim 1, further comprising a housing, each of said pyrotechnic gas generator, said cartridge-case base, said spring and said pressure piston being disposed in said housing, said hydraulic circuit including a hydraulic circuit wall, said housing being exchangeably inserted in said wall.

4. A device according to claim 3, wherein said pressure piston acts directly on oil disposed in said hydraulic circuit, said housing including a shoulder for limiting movement of said pressure piston.

5. A device according to claim 3, further comprising a limit stop for limiting movement of said cartridge-case base, said limit stop being disposed in said housing.

* * * * *